United States Patent

Gold

[15] 3,687,153
[45] Aug. 29, 1972

[54] SYSTEM FOR INSTALLING THREE-PORT FLUID ELEMENTS IN CONDUIT CIRCUITS

[72] Inventor: Harold Gold, 3645 Tolland Rd., Shaker Heights, Ohio 44122

[22] Filed: May 20, 1971

[21] Appl. No.: 145,136

[52] U.S. Cl. ................ 137/112, 137/115, 137/118
[51] Int. Cl. ............................................. G05d 7/01
[58] Field of Search...137/112, 115, 119, 118, 493.7, 137/493.8, 493.9, 116.3, 116.5, 513.3, 513.7; 285/93

[56] References Cited

UNITED STATES PATENTS

| | | | |
|---|---|---|---|
| 1,885,363 | 11/1932 | Leitner | 137/513.3 |
| 2,399,275 | 4/1946 | Wenk | 285/93 |
| 3,455,322 | 7/1969 | Chichester | 137/115 |
| 3,500,854 | 3/1970 | Altmeppen | 137/118 |

Primary Examiner—M. Cary Nelson
Assistant Examiner—William H. Wright

[57] ABSTRACT

This invention relates to the construction of three port fluid circuit elements such as pressure regulating valves, pressure selectors and the like. The construction utilizes the element housing to form a conduit fitting seat-insert. The form thereby permits the circuit element to be installed within a conduit fitting such as a union type Tee.

8 Claims, 7 Drawing Figures

PATENTED AUG 29 1972
3,687,153
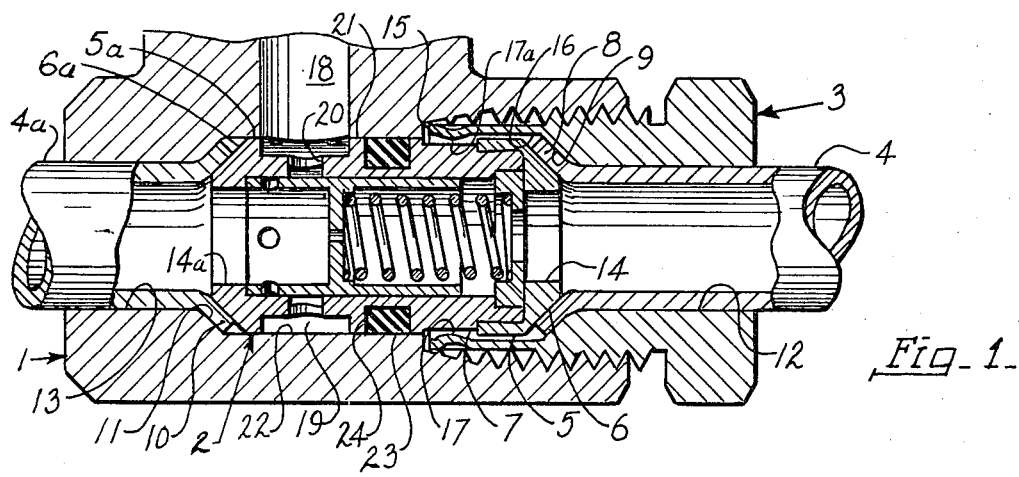
Fig. 1.
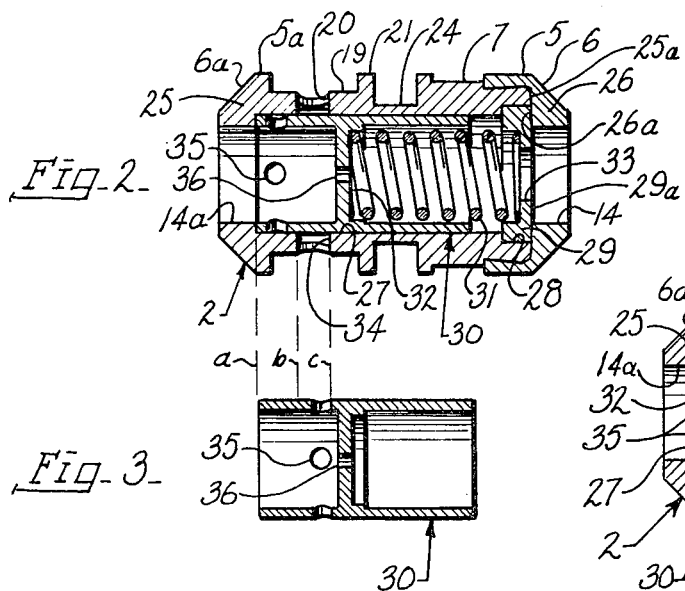
Fig. 2.
Fig. 3.
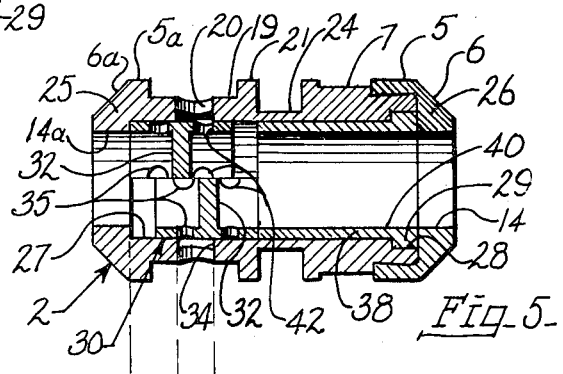
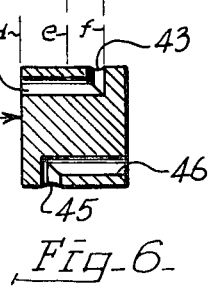
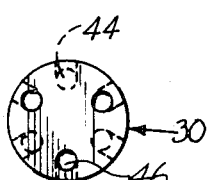
Fig. 6.
Fig. 7.
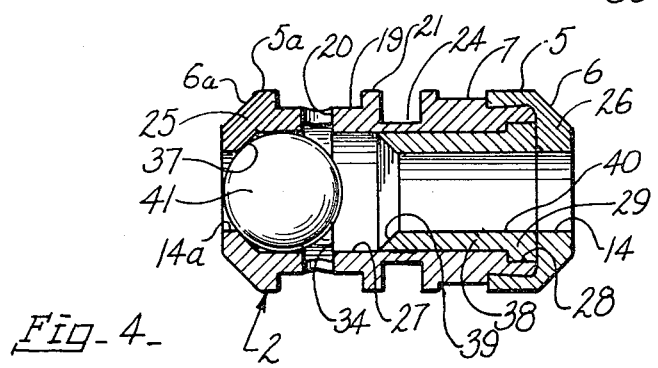
Fig. 4.
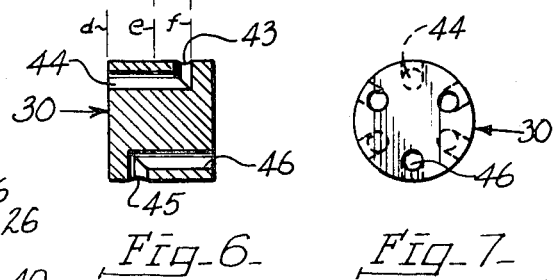
Fig. 5.
INVENTOR
Harold Gold

SYSTEM FOR INSTALLING THREE-PORT FLUID ELEMENTS IN CONDUIT CIRCUITS

BACKGROUND OF THE INVENTION

1. Field of the Invention

This invention provides means by which fluid circuit elements that utilize three ports may be installed in three-port bodies such as conduit Tee fittings.

2. The Prior Art

The present invention utilizes the conduit fastening system described in my copending application, Ser. No. 124,741, entitled FLUID TIGHT CONDUIT FASTENING SYSTEM, filed Mar. 16, 1971; and extends the utility of the seat-insert described in my copending application entitled SYSTEM FOR INSTALLING FLUID ELEMENTS IN CONDUIT CIRCUITS, deposited Apr. 27, 1971. The utility of the seat-insert is here extended to include three-port fluid circuit elements.

In the case of three-port fluid circuit seat-inserts that are clamped by a bored screw and a shouldered nut, such as disclosed by Wenk in U.S. Pat. No. 2,399,275, the axially aligned and oppositely facing ports are sealed through the seat clamping action of the screw and nut; but, the third-port seal provided by Wenk requires that the bored screw clamp a ring gasket under the screw head while the screw end simultaneously clamps the seat-insert. In such an arrangement, the clamping forces at the screw head and end differ greatly under very small dimensional variations of the mating parts.

In the present invention, the third-port seal is provided by a means that does not require axial clamping; and, therefore the clamping of the axially aligned ports is adjustable independently of the third-port seal.

SUMMARY OF THE INVENTION

The invention provides a construction through which fluid circuit elements that utilize three ports are contained within seat-inserts of conduit fittings. The end faces of the seat-insert are clamped against conduit ends in a bored-screw and shouldered nut mechanism; and thereby, are joined in a fluid tight manner to the tube or pipe. The third-port access is provided in the side of the seat-insert and a groove is provided to contain a seal ring that prevents the flow of leakage from the third-port access. This leakage would flow along the side of the insert and out of the fitting through the threads of the screw-nut assembly. The seat-insert utilizes two characteristically cylindrical parts that are joined coaxially. A transverse, axially perpendicular partition, which is secured between the two cylindrical parts, supports the circuit elements that coact with the passages within the insert to form the circuit element.

It is an object of this invention to provide an improved third-port for seat-insert type conduit couplings.

It is yet another object to provide means whereby three-port fluid circuit elements such as externally-referenced pressure regulating valves, high and low pressure-selectors and the like can be housed in seat-inserts.

These and other objects and advantages of this invention will be presented in the Detailed Description that is part of this Specification.

BRIEF DESCRIPTION OF THE DRAWINGS

FIG. 1 shows a fragmentary, cross-sectional view of a seat-insert type of tube union having a Tee outlet, and in which the seat-insert is configured, in accordance with this invention, to form an externally-referenced, pressure-relief valve;

FIG. 2 shows a duplicate, cross-sectional view of the seat-insert shown in FIG. 1, and is included to permit clearer identification of the parts and features;

FIG. 3 shows a cross-sectional view of a piston that is interchangeable with the piston shown in FIG. 2, and through which the insert is configured to form an externally-referenced, pressure-reducing valve;

FIG. 4 shows a cross-sectional view of a seat-insert that is externally a duplicate of the seat-insert shown in FIG. 1 and which is configured, in accordance with this invention, to form a ball-type, high-pressure selector;

FIG. 5 shows a cross-sectional view of a seat-insert that is externally a duplicate of the seat-insert shown in FIG. 1 and which is configured, in accordance with this invention, to form a piston-type, high-pressure selector;

FIG. 6 shows a cross-sectional view of a piston that is interchangeable with the piston shown in FIG. 5, and through which the insert is configured to form a piston-type, low-pressure selector; and, FIG. 7 shows an end view of the piston shown in FIG. 6 and illustrates the manner in which multiple passages may be accommodated.

DETAILED DESCRIPTION OF THE INVENTION

In the description that follows all parts having the same function are identified in all figures by the same numeral.

As described in my copending application, Ser. No. 124,741, the flared tube assembly illustrated in FIG. 1 comprises nut body 1, seat-insert 2 bored screw 3 and flared tubes 4 and 4a. Seat-insert 2 is provided with equal diameter lands 5 and 5a, coaxial ends 6 and 6a and cylindrical groove 7. The cone angles of conical end 6, of flared end 8 of tube 4, and of conical shoulder 9 in screw 3 are substantially equal. Similarly, the cone angles of conical end 6a, of flared end 10 of tube 4a, and of conical shoulder 11 in nut body 1 are substantially equal. Bore 12 in screw 3 mates with tube 4; bore 13 in nut body 1 mates with tube 4a; and bore 14 and bore 14a in seat-insert 2 provide the communicating passages between the internal portion of seat-insert 2 and tubes 4 and 4a. The two sets of mating cones are simultaneously clamped into sealing contact by the screw motion of screw 3 into nut body 1.

Tubular portion 15 is integral with and projects coaxially from screw 3. The outer diameter of tube 15 is equal to or smaller than the root diameter of the threads of screw 3 and the bore 16 is slightly larger than the diameter of lands 5 and 5a. The wall of tube 15 is provided with a pair of diametrially opposite indentations 17 and 17a. The diametral distance between innermost points of indentations 17 and 17a is smaller than the diameter of lands 5 and 5a, but is greater than the diameter of groove 7. The diameter of the indentations 17 and 17a is less than the width of groove 7. Accordingly seat-insert 2 is permitted to move axially and laterally within this attachment for clamping alignment, but remains attached to screw 3 upon disconnection of screw 3 from nut body 1. During insertion into or removal of seat-insert 2 from bore 16 through the application of an axial force between seat-insert 2 and screw 3 tube 15 elastically deforms into oval shape when the indentations 17 and 17a contact land 5. The oval deformation is permitted by the clearance between bore 16 and land 5.

In the present invention, the nut body 1 illustrated in FIG. 1 includes a third-port passage 18 which isaligned with cylindrical groove 19 of seat-insert 2. Groove 19 communicates with the internal portion of seat-insert 2 through radial holes 20. Cylindrical land 21 of seat-insert 2 of is substantially the same diameter as lands 5 and 5a and fits with small clearance in bore 22 of nut body 1. Leakage of fluid from groove 19 through the clearance between land 21 and bore 22, which could continue outwardly through the threads of screw 3, is blocked by elastic seal ring 23. Ring 23 is retained in cylindrical groove 24. Seal ring 23 is of the pressure-seal type such as an O-ring, and therefore the seal effectiveness is independent of the clamping force that is applied to the tube end flares 8 and 10.

As more clearly identified in FIG. 2, seat-insert 2 is made of two external parts or shells 25 and 26 that join on one side of groove 7. In part 25, bores 14a, 27 and 28 join in expanding sequence. Cylindrical partition 29 mates with bore 28 and is locked therein by the attachment of part 26 to part 25. As indicated in FIGS. 1 and 2, parts 25 and 26 are swaged together along conical surfaces as is described in the copending application, deposited Apr. 27, 1971, and are joined in the axially perpendicular plane that is defined by the surface 25a of part 25, surface 26a of the part 26 and surface 29a of part 29. Piston 30 mates slideably in bore 27 and is urged toward bore 14a by spring 31. Spring 31 is compressed between partition 29 and wall 32 of piston 30. Bore 33 in partition 29 communicates the spring side of piston 30 with bore 14 and thereby with conduit 4. INternal groove 34 in the wall of bore 27 communicates with groove 19 through holes 20. Radial holes 35 penetrate the wall of piston 30. When the pressure in conduit 4a exceeds the pressure in conduit 4 by an amount that is sufficient to overcome the force of spring 31, piston 30 moves axially toward bore 14 and in so doing aligns holes 35 with groove 34 and fluid flows from conduit 4a through bore 14a and bore 35, and into groove 19 through groove 34 and holes 20. Third-port passage 18 is connected as required to accept the flow from groove 19. When the pressure in conduit 4 is regulated by a pilot regulator, flow for the pilot regulator may be obtained from an orifice hole such as indicated by hole 36 in wall 32.

FIG. 3 shows a modification to piston 30 that changes the function of the assembly of FIG. 1. As may be observed by means of the reference lines a, b and c, the holes 35 in FIG. 3 are axially positioned to align with groove 34, in fully open position, when piston 30 rests against the shoulder formed at the junction of bores 14a and 27. In all other respects, the piston of FIG. 3 is identical with piston 30 of FIG. 2. Thus, with piston 30 of FIG. 3 installed in the assembly of FIG. 1, fluid flows from the third-port passage 18 into groove 19 and through holes 20, groove 34, holes 35 and into conduit 4a through bore 14a. When the pressure in conduit 4a exceeds the pressure in conduit 4 by an amount that is sufficient to overcome the force of spring 31, piston 30 moves axially toward bore 14 and in so doing moves holes 35 out of alignment with groove 34. As in the previous case, orifice 36 may be employed to supply flow to a pilot regulator that is connected to conduit 4.

The seat-insert illustrated in FIG. 4 is interchangeable with the seat-insert shown in FIG. 1 with respect to the forming of a seal against the flared ends of tubes 4 and 4a and also with respect to the retention of the seal ring 23; but, is configured in a different manner to form a high-pressure selector. The seat-insert of FIG. 4 utilizes a conical surface 37 to join bore 27 to bore 14a and provides partition 29 with a tubular projection 38 that fits in bore 27 and terminates with conical surface 39. The bore 40 of projection 38 is of substantially the same diameter as bore 14. Ball 41 fits slideable in bore 27 and is captured therein between surfaces 37 and 39. Internal groove 34 lies substantially midway between surfaces 37 and 39. When the fluid pressure that is transmitted to bore 14 is greater than that transmitted to bore 14a, ball 41 is driven against surface 37 and the higher of the two pressures is transmitted to groove 19 through groove 34 and holes 20. When the pressure that is transmitted to bore 14a is greater than that transmitted to bore 14, ball 41 is driven against surface 39 and groove 34 becomes exposed to bore 14a, whereby the higher pressure in bore 14a is transmitted to groove 19.

The seat-insert illustrated in FIG. 5 is interchangeable with the seat-insert shown in FIG. 1 with respect to the forming of a seal against the flared ends of tubes 4 and 4a and also with respect to the retention of the seal ring 23; but, is configured in a manner different than that of FIG. 4 to form a high-pressure selector. In FIG. 5, piston 30 is drawn in imaginary halves, split in an axial plane, the upper half being displaced toward bore 14a and the lower half being displaced toward bore 40. Piston 30 fits slideably in bore 27 and is limited in axial movement by the shoulder formed at the intersection of bores 14a and 27 and the shoulder formed at the intersection of bores 40 and 27. Partition 32 is located substantially midway in piston 30 and holes 35 and 42 are spaced axially equidistant from partition 32. When the fluid pressure that is transmitted to bore 14 is greater than the pressure transmitted to bore 14a, piston 30 is driven toward bore 14a and rests against the shoulder formed at the intersection of bores 14 a and 27, in which case holes 42 align with groove 34 and the higher pressure in bore 14 is transmitted to groove 19. When the pressure that is transmitted to bore 14a is greater than the pressure transmitted to bore 14, piston 30 is driven toward bore 40 and rests against the shoulder formed at the intersection of bores 40 and 27, in which case holes 35 align with groove 34 and the higher pressure in bore 14a is transmitted to groove 19.

FIG. 6 shows a modification to piston 30 of FIG. 5 that changes the function of seat-insert 2 of FIG. 5. As may be observed through the reference lines d, e and f, the holes 43 are axially positioned to align with groove 34 when piston 30 rests against the shoulder formed at the junction of bores 14a and 27. Longitudinal holes 44 communicate radial holes 43 with bore 14a. Radial holes 43 and 45 are spaced symetrically about the axial mid-plane of piston 30 and longitudinal holes 46 communicate radial holes 45 with bore 40. The longitudinal holes may be spaced circumferentially as shown in the end view given in FIG. 7. When the fluid pressure that is transmitted to bore 14 is greater than that transmitted to bore 14a, piston 30 is driven against the shoulder formed at the junction of bores 14a and 27, and holes 43 align with groove 34, whereby the lower pressure existing at bore 14a is transmitted to groove 19. When the pressure that is transmitted to bore 14a is greater than that transmitted to bore 14, piston 30 is driven against the shoulder formed at the junction of bore 40 and 27, and holes 45 align with groove 34, whereby the lower pressure existing at bore 14 is transmitted to groove 19.

For conciseness, reference has been made only to seat-inserts having sealing faces that are adapted to mate with flared tubes or conically faced flanges; and, the installation of the seat-insert has been shown only in a tube union having a side port. However, as will be readily understood by those skilled in the art, the seat-insert construction of this invention can be employed with the other sealing face arrangements shown in application Ser. No. 124,741, and with the conduit-to-body assemblies disclosed in that application.

What is claimed is:

1. A seat member for a conduit coupling assembly, said seat member having a coaxial pair of end faces, said end faces forming sealing surfaces that mate with conduit ends, said end faces being spaced apart by a substantially cylindrical body, said body being substantially coaxial with said end faces, said seat member having:
   a. a first part and a second part, said parts being joined in a plane that is perpendicular to the axis of said end faces;
   b. said first part having three bores in expanding sequence, the first and smallest of said bores opening at the end face of said first part and the third and largest of said bores opening in said perpendicular plane, adjacent bores being connected by annular surfaces;
   c. said first part further having cylindrical grooves in the surface of said cylindrical body, the first of said grooves being between said end face of said first part and a second groove, said first groove communicating with the second bore in said first part through radial holes in said body, and said second groove being adapted to retain an elastic sealing ring, said ring being adapted in said coupling assembly to prevent flow from said first groove to pass along said body;
   d. said second part having a bore that opens at the end face of said second part and having a passage that communicates said bore with said perpendicular plane;
   e. a partition that fits in said largest bore of said first part, said partition being held therein by the joining of said parts, a through hole being in said partition, said hole providing the flow path across said partition; and,
   f. means mating with said second bore in said first part and with said partition, said means being adapted to provide a fluid circuit element that operates on the flow between said first groove and said bores opening at said end faces.

2. The seat member of claim 1 further including an internal, cylindrical groove in said second bore in said first part, said radial holes communicating said internal groove with said first groove in the surface of said cylindrical body; and said means mating with said second bore in said first part and with said partition being a piston and a spring, said piston mating slideably in said second bore and being adapted to cover said internal groove, and said spring being compressed between the head of said piston and said partition; said piston being adapted to uncover said internal groove when actuated by the pressure in said smallest bore in said first part to further compress said spring.

3. The seat member of claim 2 in which said piston is adapted to cover said internal groove in said second bore in said first part when actuated by the pressure in said smallest bore in said first part to further compress said spring.

4. The seat member of claim 2 further including an orifice in the head of said piston.

5. The seat member of claim 3 further including an orifice in the head of said piston.

6. The seat member of claim 1 further including: an internal groove in said second bore in said first part, said radial holes communicating said internal groove with said first groove in the surface of said cylindrical body, and a tubular member that is attached to said partition, said tubular member extending axially in said second bore in said first part and forming an annular seat at its free end; and said means mating with said second bore in said first part being a ball, said ball mating slideably in said second bore in said first part and being adapted to uncover said groove when seated on said annular seat at the free end of said tubular member and when seated on the shoulder formed at the junction of said first and second bores in said first part.

7. The seat member of claim 6 wherein said means mating with said second bore in said first part is a piston, said piston being tubular with a centrally spaced internal, transverse wall and having radial holes in the tubular wall, said radial holes being spaced symetrically about and on opposite sides of said transverse wall; said piston being so adapted that said radial holes in said tubular wall communicate said internal groove in said second bore with said first bore in said first part when said piston is seated against said seat at the free end of said tubular member and with the bore of said tubular member when said piston is seated against said shoulder formed at the junction of said first and second bores in said first part.

8. The seat member of claim 6 wherein said means mating with said second bore in said first part is a piston, said piston having longitudinal and radial holes that intersect, aid radial holes being of partial depth and being spaced symetrically about the axial midplane of said piston, said longitudinal holes being of partial depth, and said holes being so disposed that said holes communicate said internal groove in said first part with said first bore in said first part when said piston is seated against said shoulder formed at the junction of said first and second bores in said first part, and said holes being further disposed that said holes communicate said internal groove in said first part with the bore of said tubular member when said piston is seated against the free end of said tubular member.

* * * * *